United States Patent
Sannodo et al.

(10) Patent No.: US 9,817,018 B2
(45) Date of Patent: Nov. 14, 2017

(54) DECELERATION FACTOR ESTIMATION APPARATUS

(75) Inventors: Shinya Sannodo, Toyota (JP); Hirotada Otake, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 672 days.

(21) Appl. No.: 14/368,894

(22) PCT Filed: Dec. 28, 2011

(86) PCT No.: PCT/JP2011/080475
§ 371 (c)(1),
(2), (4) Date: Jun. 26, 2014

(87) PCT Pub. No.: WO2013/099011
PCT Pub. Date: Jul. 4, 2013

(65) Prior Publication Data
US 2015/0212107 A1  Jul. 30, 2015

(51) Int. Cl.
*G01P 15/00* (2006.01)
*B60W 40/107* (2012.01)
*B60W 40/10* (2012.01)

(52) U.S. Cl.
CPC ......... *G01P 15/00* (2013.01); *B60W 40/1005* (2013.01); *B60W 40/107* (2013.01); *B60T 2250/02* (2013.01); *B60W 2510/0666* (2013.01); *B60W 2510/085* (2013.01); *B60W 2520/10* (2013.01); *B60W 2520/105* (2013.01); *B60W 2530/10* (2013.01); *B60W 2530/16* (2013.01)

(58) Field of Classification Search
USPC ........................................ 702/141
See application file for complete search history.

(56) References Cited

U.S. PATENT DOCUMENTS

| 4,735,114 A * | 4/1988 | Satoh | B60W 10/06 477/111 |
| 6,208,926 B1 | 3/2001 | Wagner et al. | |

(Continued)

FOREIGN PATENT DOCUMENTS

| DE | 19728867 A1 | 1/1999 |
| DE | 101 44 699 A1 | 4/2002 |

(Continued)

OTHER PUBLICATIONS

International Search Report dated Apr. 17, 2012, in PCT/JP11/080475 filed Dec. 28, 2011.
Office Action dated Apr. 12, 2017 in U.S. Appl. No. 14/376,273.

*Primary Examiner* — Paul D Lee
(74) *Attorney, Agent, or Firm* — Oblon, McClelland, Maier & Neustadt, L.L.P.

(57) ABSTRACT

A deceleration factor estimation apparatus estimating a deceleration factor of a vehicle includes: a driving force acquisition unit that obtains a driving force of the vehicle; a speed acquisition unit that obtains a speed of the vehicle; an acceleration acquisition unit that obtains an acceleration of the vehicle; and a deceleration factor estimation unit that estimates a plurality of deceleration factors on the basis of a relationship between the obtained driving force, speed, and acceleration, wherein the deceleration factor estimation unit switches the deceleration factor to be estimated on the basis of a travel condition of the vehicle.

16 Claims, 7 Drawing Sheets

(56) References Cited

U.S. PATENT DOCUMENTS

| | | | |
|---|---|---|---|
| 6,347,269 B1 | 2/2002 | Hayakawa et al. | |
| 2004/0048118 A1* | 3/2004 | Nakaji | H01M 16/006 |
| | | | 429/429 |
| 2004/0107082 A1 | 6/2004 | Sato et al. | |
| 2005/0000305 A1* | 1/2005 | Yamada | G01G 19/086 |
| | | | 73/865 |
| 2005/0010356 A1* | 1/2005 | Ishiguro | G01G 19/086 |
| | | | 701/124 |
| 2007/0173372 A1 | 7/2007 | Ueno | |
| 2008/0255732 A1* | 10/2008 | Yasui | B60T 8/442 |
| | | | 701/48 |
| 2009/0043428 A1* | 2/2009 | Matsunaga | B60W 40/107 |
| | | | 701/1 |
| 2009/0112386 A1* | 4/2009 | Saitoh | B60L 11/1887 |
| | | | 701/22 |
| 2010/0023296 A1 | 1/2010 | Huang et al. | |
| 2010/0250042 A1* | 9/2010 | Shamoto | B60W 20/00 |
| | | | 701/22 |
| 2011/0066376 A1 | 3/2011 | Takaoka | |
| 2011/0130931 A1* | 6/2011 | Yoshikawa | F16H 61/0213 |
| | | | 701/55 |
| 2011/0241865 A1* | 10/2011 | Saito | B60W 50/14 |
| | | | 340/439 |
| 2015/0019158 A1 | 1/2015 | Sannodo et al. | |

FOREIGN PATENT DOCUMENTS

| | | |
|---|---|---|
| EP | 1 215 071 A1 | 6/2002 |
| EP | 1298020 A1 | 4/2003 |
| GB | 2336683 A | 10/1999 |
| JP | 2002-81989 | 3/2002 |
| JP | 2007-271282 | 10/2007 |
| JP | 2011-16465 | 1/2011 |

\* cited by examiner

DECELERATION FACTOR ESTIMATION APPARATUS

TECHNICAL FIELD

The invention relates to a deceleration factor estimation apparatus.

BACKGROUND ART

A conventional travel assistance apparatus is installed in a vehicle to assist travel by the vehicle. To assist travel by the vehicle, the travel assistance apparatus determines behavior of the vehicle on the basis of various characteristics of the vehicle. Here, the various characteristics of the vehicle include characteristics that vary in accordance with travel conditions. Apparatuses described in Patent Document 1 to Patent Document 3, for example, are available as apparatuses that detect these varying characteristics of the vehicle. Patent Document 1 describes a system that calculates a travel energy of a vehicle. This system determines the travel energy by calculating a gradient resistance, an air resistance, an acceleration resistance, and a rolling resistance on the basis of an estimated travel speed, parameters relating to the vehicle, and parameters relating to a road. Patent Documents 2 and 3 describe apparatuses that estimate a weight of the vehicle.

Patent Document 1: Japanese Patent Application Publication No. 2011-016465 (JP 2011-016465 A)

Patent Document 2: Japanese Patent Application Publication No. 2007-271282 (JP 2007-271282 A)

Patent Document 3: Japanese Patent Application Publication No. 2002-81989 (JP 2002-81989 A)

SUMMARY OF THE INVENTION

Here, the characteristics of the vehicle include characteristics relating to deceleration, or in other words characteristics that generate travel resistance during travel. By calculating these deceleration factors and performing various types of control on the basis of the calculation results, the vehicle can be controlled appropriately. The deceleration factors of the vehicle include factors that vary in accordance with the travel conditions. These vehicle deceleration factors that vary in accordance with the travel conditions include the air resistance and rolling resistance described in Patent Document 1, and the vehicle weight described in Patent Documents 2 and 3. In Patent Documents 1 to 3, the respective deceleration factors are estimated by calculating various conditions, but the estimated deceleration factors may deviate from actual deceleration factors, leading to a reduction in estimation precision.

The invention has been designed in consideration of the circumstances described above, and an object thereof is to provide a deceleration factor estimation apparatus capable of estimating a deceleration factor with a higher degree of precision.

To achieve the object described above, the invention is a deceleration factor estimation apparatus estimating a deceleration factor of a vehicle, this apparatus including: a driving force acquisition unit that obtains a driving force of the vehicle; a speed acquisition unit that obtains a speed of the vehicle; an acceleration acquisition unit that obtains an acceleration of the vehicle; and a deceleration factor estimation unit that estimates a plurality of deceleration factors on the basis of a relationship between the obtained driving force, speed, and acceleration, wherein the deceleration factor estimation unit switches the deceleration factor to be estimated on the basis of a travel condition of the vehicle.

Further, the deceleration factor estimation unit preferably switches the deceleration factor to be estimated on the basis of the vehicle speed and the acceleration.

Further, the deceleration factors preferably include a vehicle weight, and the deceleration factor estimation unit preferably sets the vehicle weight as the deceleration factor to be estimated when the vehicle speed is lower than a threshold and the acceleration is higher than a threshold.

Further, the deceleration factors preferably include an air resistance coefficient, and the deceleration factor estimation unit preferably sets the air resistance coefficient as the deceleration factor to be estimated when the vehicle speed is higher than a threshold and the acceleration is lower than a threshold.

Further, the deceleration factors preferably include a road load, and the deceleration factor estimation unit preferably sets the road load as the deceleration factor to be estimated when the vehicle speed is lower than a threshold and the acceleration is lower than a threshold.

To achieve the object described above, the invention is a deceleration factor estimation apparatus that estimates a deceleration factor of a vehicle, including: a driving force acquisition unit that obtains a driving force of the vehicle; a speed acquisition unit that obtains a speed of the vehicle; an acceleration acquisition unit that obtains an acceleration of the vehicle; and a deceleration factor estimation unit that estimates the deceleration factor on the basis of a relationship between the obtained driving force, speed, and acceleration, wherein the deceleration factor includes an air resistance coefficient, and the deceleration factor estimation unit estimates the air resistance coefficient when a travel condition of the vehicle satisfies a set condition.

Further, the set condition of the travel condition of the vehicle is preferably satisfied when the vehicle speed is higher than a threshold.

Further, the set condition of the travel condition of the vehicle is preferably satisfied when the acceleration is equal to or lower than a threshold.

To achieve the object described above, the invention is a deceleration factor estimation apparatus estimating a deceleration factor of a vehicle, this apparatus including: a driving force acquisition unit that obtains a driving force of the vehicle; a speed acquisition unit that obtains a speed of the vehicle; an acceleration acquisition unit that obtains an acceleration of the vehicle; and a deceleration factor estimation unit that estimates the deceleration factor on the basis of a relationship between the obtained driving force, speed, and acceleration, wherein the deceleration factor includes a road load, and the deceleration factor estimation unit estimates the road load when a travel condition of the vehicle satisfies a set condition.

Further, the set condition of the travel condition of the vehicle is preferably satisfied when the vehicle speed is lower than a threshold.

Further, the set condition of the travel condition of the vehicle is preferably satisfied when the acceleration is higher than a threshold.

Further, the deceleration factors preferably include a vehicle weight, an air resistance coefficient, and a road load, and the deceleration factor estimation unit preferably estimates the deceleration factor to be estimated by analyzing a relationship between the deceleration factor, the driving force, the speed, and the acceleration using an equation of motion.

Further, the deceleration factor estimation unit preferably uses set values for the deceleration factors other than the deceleration factor to be estimated in the equation of motion.

With the deceleration factor estimation apparatus according to the invention, a deceleration factor can be estimated with a high degree of precision.

MODES FOR CARRYING OUT THE INVENTION

Embodiments of the invention will be described in detail below on the basis of the drawings. Note that the invention is not limited to these embodiments. Further, constituent elements of the following embodiments include elements that could be replaced easily by a person skilled in the art or substantially identical elements.

[First Embodiment]

Figure 1:
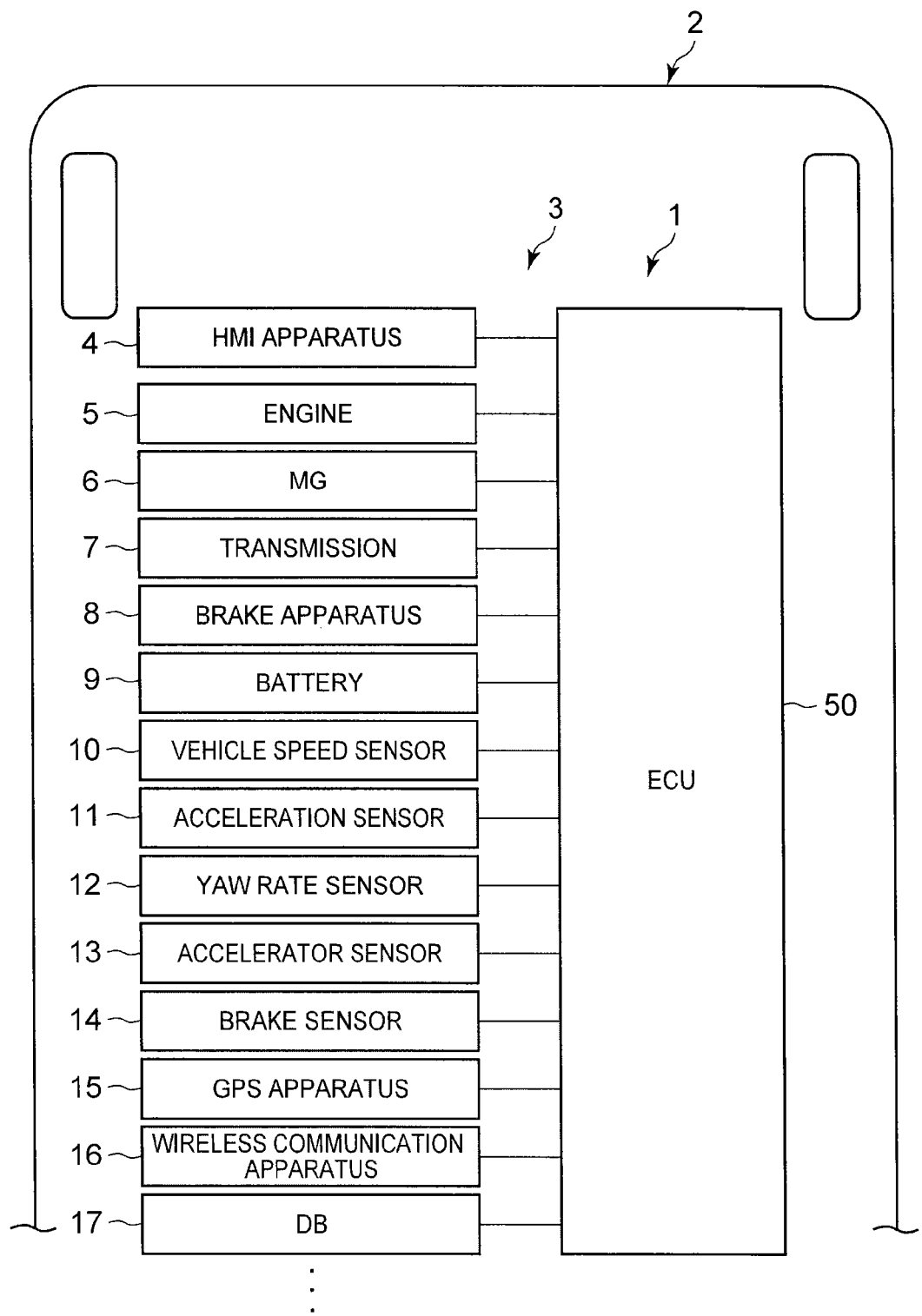
FIG. 1 is a schematic view showing a configuration of a vehicle control system.
Figure 2:
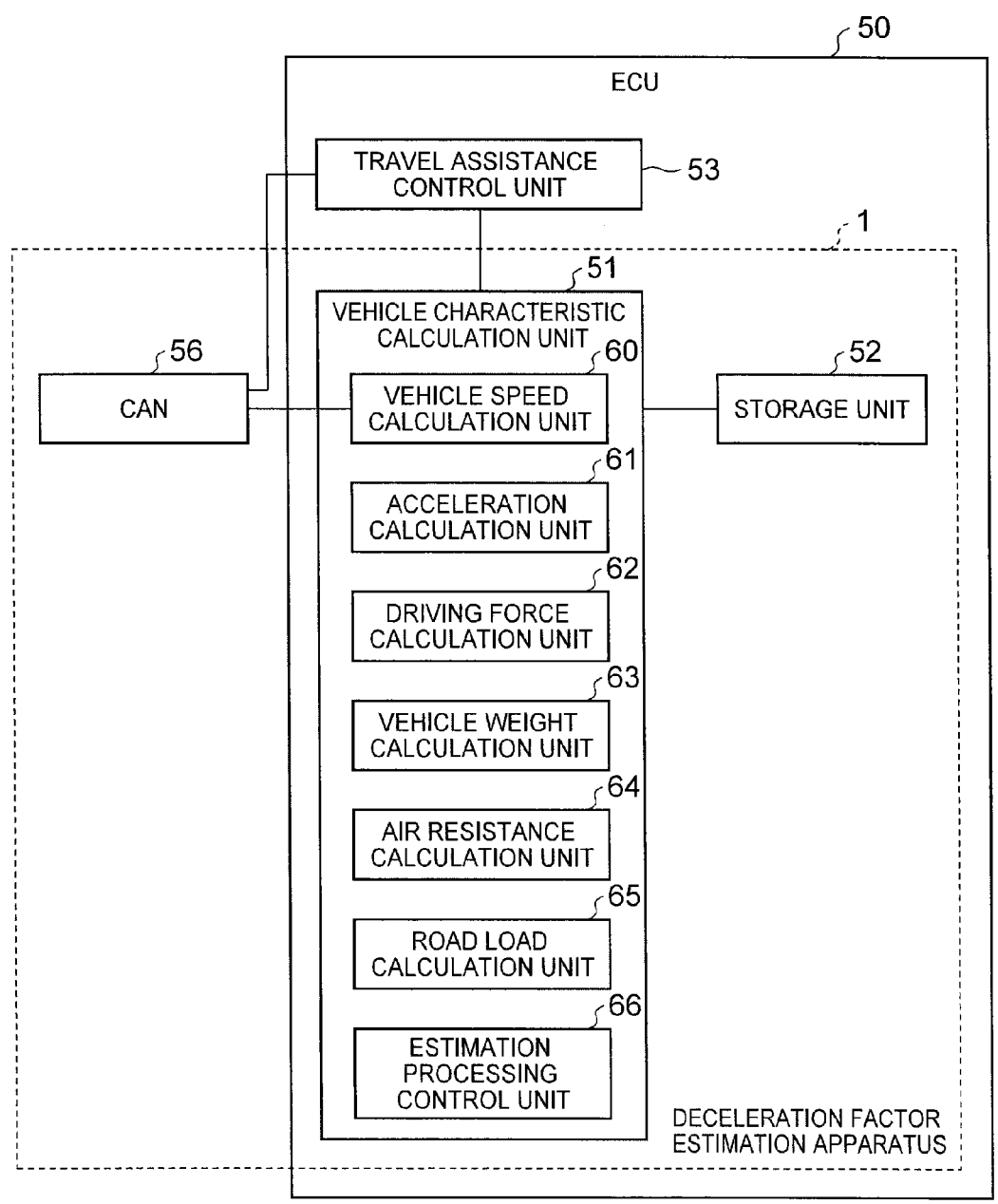
FIG. 2 is a schematic block diagram showing an example of a configuration of an electronic control unit (ECU) and a deceleration factor estimation apparatus.

FIG. 1 is a schematic view showing a configuration of a vehicle control system according to a first embodiment, and FIG. 2 is a schematic block diagram showing an example of a configuration of an ECU and a deceleration factor estimation apparatus.

As shown in FIG. 1, a deceleration factor estimation apparatus 1 according to this embodiment is applied to a vehicle control system 3 installed in a vehicle 2. The deceleration factor estimation apparatus 1 includes an ECU 50. The deceleration factor estimation apparatus 1 estimates a deceleration factor by performing various calculations using the ECU 50 in accordance with conditions. Travel conditions of the vehicle 2 according to this embodiment are estimated by the ECU 50 using the deceleration factor estimated by the deceleration factor estimation apparatus 1, and various types of travel assistance are provided in order to assist travel by the vehicle 2 by controlling a human machine interface (HMI) apparatus (an assistance apparatus) 4, a drive source (an engine 5, a motor/generator (MG) 6), and the like on the basis of an estimation result.

The vehicle control system 3 according to this embodiment is a so-called hybrid system in which a travel drive source for driving a drive wheel of the vehicle 2 to rotate is constituted by a combination of the engine 5 and the MG 6.

In other words, the vehicle 2 is a hybrid vehicle including the MG 6 as a travel drive source in addition to the engine 5. The vehicle 2 is configured such that an improvement in fuel efficiency can be achieved by operating the engine 5 in a maximum efficiency condition, compensating for deficiency and excess in an amount of power and an engine brake force using the MG 6, which is a rotating electric machine, and regenerating energy during deceleration.

More specifically, the vehicle control system 3 includes the HMI apparatus 4, the engine 5, which is constituted by an internal combustion engine, the MG 6, which is constituted by a motor, a transmission 7, a brake apparatus 8, a battery 9, and so on. The vehicle control system 3 also includes a vehicle speed sensor 10, an acceleration sensor 11, a yaw rate sensor 12, an accelerator sensor 13, a brake sensor 14, a global positioning system (GPS) apparatus 15, a wireless communication apparatus 16, a database (DB) 17, and so on.

The HMI apparatus 4 is an assistance apparatus that is capable of outputting driving assistance information, which is information used to assist driving of the vehicle 2. The HMI apparatus 4 provides a driver with the driving assistance information and so on. The HMI apparatus 4 is an in-vehicle device, and includes a display apparatus (a visual information display apparatus), a speaker (an audio output apparatus), and so on provided in a cabin of the vehicle 2, for example. Existing apparatuses such as a display apparatus, a speaker, and so on of a navigation (NAVI) system, for example, may be used as is as the HMI apparatus 4. The HMI apparatus 4 guides a driving operation performed by the driver by providing information such as voice information and visual information (pictorial information and alphabetical information) so that an improvement in fuel efficiency can be achieved. By providing this information, the HMI apparatus 4 assists the driver in achieving target values through his/her driving operations. The HMI apparatus 4 is electrically connected to the ECU 50 and controlled by the ECU 50. Note that the HMI apparatus 4 may be configured to include a sensory information output apparatus or the like that outputs sensory information such as steering wheel vibration, seat vibration, a pedal reaction force, and so on, for example.

The engine 5, the MG 6, the transmission 7, the brake apparatus 8, the battery 9, and so on are installed in the vehicle control system 3 as various actuators for realizing travel by the vehicle 2.

The engine 5 causes a driving force to act on a wheel of the vehicle 2 in response to an acceleration request operation, for example an accelerator pedal depression operation, performed by the driver. The engine 5 consumes fuel to generate engine torque that serves as travel power applied to a drive wheel of the vehicle 2. In other words, the engine 5 is a heat engine that outputs thermal energy generated by burning fuel in the form of mechanical energy such as torque, and may be constituted by a gasoline engine, a diesel engine, a liquefied petroleum gas (LPG) engine, or the like, for example. The engine 5 includes, for example, a fuel injection apparatus, an ignition apparatus, a throttle valve apparatus, and so on, not shown in the drawings, and these apparatuses are electrically connected to the ECU 50 so as to be controlled by the ECU 50. Output torque from the engine 5 is controlled by the ECU 50. Note that the power generated by the engine 5 may be used during power generation by the MG 6.

The MG 6 causes a driving force to act on the wheel of the vehicle 2 in response to an acceleration request operation, for example an accelerator pedal depression operation, performed by the driver. The MG 6 converts electric energy into mechanical power to generate motor torque that serves as the travel power applied to the drive wheel of the vehicle 2. The MG 6 is a so-called rotating electric machine having a stator as a fixed element and a rotor as a rotary element. The MG 6 is both a motor that converts electric energy into mechanical power and outputs the mechanical power, and a power generator that converts mechanical power into electric energy and collects the electric energy. In other words, the MG 6 functions as both a motor that is driven by a supply of power to convert electric energy into mechanical energy and output the mechanical energy (a power running function), and a power generator that converts mechanical energy into electric energy (a regeneration function). The MG 6 is electrically connected to the ECU 50 via an inverter or the like that performs conversion between a direct current and an alternating current, and is thus controlled by the ECU 50. An output torque and a power generation amount of the MG 6 are controlled by the ECU 50 via the inverter.

The transmission 7 is a power transmission apparatus that speed-shifts a rotary output generated by the engine 5 and the MG 6 and transmits the speed-shifted rotary output to the drive wheel side of the vehicle 2. The transmission 7 may be a so-called manual transmission (MT), or a so-called automatic transmission (AT) such as a stepped AT, a continuously variable transmission (CVT), a multimode manual transmission (MMT), a sequential manual transmission (SMT), or a dual clutch transmission (DCT). It is assumed in the following description that the transmission 7 is a CVT employing a planetary gear mechanism and so on, for example. A transmission actuator or the like of the transmission 7 is electrically connected to the ECU 50 such that the transmission 7 is controlled by the ECU 50.

The brake apparatus 8 causes a braking force to act on the wheel of the vehicle 2 in response to a braking request operation, for example a brake pedal depression operation, performed by the driver. The brake apparatus 8 applies the braking force to the wheel, which is supported rotatably on a vehicle body of the vehicle 2, by generating a predetermined frictional force (a frictional resistance force) between friction elements such as brake pads or brake discs, for example. In so doing, the brake apparatus 8 generates a braking force on a ground contact surface of the vehicle wheel of the vehicle 2, i.e. a surface of the vehicle wheel that contacts a road surface, and as a result, braking can be applied to the vehicle 2. A brake actuator or the like of the brake apparatus 8 is electrically connected to the ECU 50 such that the brake apparatus 8 is controlled by the ECU 50.

The battery 9 is a storage apparatus capable of storing power (storage) and discharging the stored power. The battery 9 is electrically connected to the ECU 50 in order to output signals relating to various information to the ECU 50. The battery 9 according to this embodiment detects an SOC (State of Charge) as information indicating a state of charge, and outputs the information to the ECU 50.

When the MG 6 functions as a motor, the power stored in the battery 9 is supplied thereto via the inverter, whereupon the MG 6 converts the supplied power into travel power for the vehicle 2 and outputs the travel power. When the MG 6 functions as a power generator, on the other hand, the MG 6 is driven by input power to generate power and charge the battery 9 with the generated power via the inverter. At this time, a brake can be applied to rotation of the rotor of the MG 6 using rotation resistance generated in the rotor (regenerative braking). Hence, during regenerative braking, motor regeneration torque, which is negative motor torque, can be generated in the rotor of the MG 6 through power regeneration, and as a result, a braking force can be applied to the drive wheel of the vehicle 2. In other words, in the vehicle control system 3, mechanical power is input into the MG 6 from the drive wheel of the vehicle 2, causing the MG 6 to generate power by regeneration, and as a result, kinetic energy of the vehicle 2 can be collected as electric energy. Further, in the vehicle control system 3, the mechanical power (negative motor torque) generated in the rotor of the MG 6 during the operation described above can be transmitted to the drive wheel, and as a result, regenerative braking can be performed by the MG 6. In this case, the braking force generated in the vehicle control system 3 decreases relatively as a regeneration amount (a power generation amount) of the MG 6 is relatively reduced, and as a result, a degree of deceleration acting on the vehicle 2 decreases relatively. On the other hand, the braking force generated in the vehicle control system 3 increases relatively as the regeneration amount (the power generation amount) of the MG 6 is relatively increased, and as a result, the degree of deceleration acting on the vehicle 2 increases relatively.

The vehicle speed sensor 10, the acceleration sensor 11, the yaw rate sensor 12, the accelerator sensor 13, and the brake sensor 14 are condition detection apparatuses that detect the travel conditions of the vehicle 2 and input (driver input) input into the vehicle 2 by the driver, or in other words state quantities and physical quantities relating to actual operations performed by the driver on the vehicle 2. The vehicle speed sensor 10 detects a speed (also referred to as the "vehicle speed" hereafter) of the vehicle 2. The acceleration sensor 11 detects an acceleration of the vehicle 2. Note that the acceleration sensor 11 according to this embodiment detects the acceleration in at least a front-rear direction of the vehicle 2. The yaw rate sensor 12 detects a yaw rate of the vehicle. The accelerator sensor 13 detects an accelerator opening, i.e. an operation amount (a depression amount) of the accelerator pedal by the driver. The brake sensor 14 detects an operation amount (a depression amount) of the brake pedal by the driver, for example a master cylinder pressure or the like. The vehicle speed sensor 10, the accelerator sensor 13, and the brake sensor 14 are electrically connected to the ECU 50 in order to output detection signals to the ECU 50.

The GPS apparatus 15 is an apparatus that detects a current position of the vehicle 2. The GPS apparatus 15 receives a GPS signal output by a GPS satellite, and on the basis of the received GPS signal, measures/calculates GPS information (X coordinate; X, Y coordinate; Y) serving as information indicating the position of the vehicle 2. The GPS apparatus 15 is electrically connected to the ECU 50 in order to output a signal relating to the GPS information to the ECU 50.

The wireless communication apparatus 16 is a read-ahead information acquisition apparatus that obtains read-ahead information relating to travel by the vehicle 2 using wireless communication. For example, the wireless communication apparatus 16 uses wireless communication to obtain the read-ahead information from an apparatus that exchanges information using a communication infrastructure such as the Internet via a road-to-vehicle communication device (a roadside device) such as an optical beacon disposed on a roadside, a vehicle-to-vehicle communication device installed in another vehicle, a Vehicle Information and Communication System (VICS) (registered trademark) center, or the like. As the read-ahead information, the wireless communication apparatus 16 obtains, for example, preceding vehicle information, following vehicle information, traffic light information, works/traffic restriction information, congestion information, emergency vehicle information, information relating to an accident history DB, and so on. The traffic light information includes, for example, information indicating a position of a traffic light ahead of the vehicle 2 in a travel direction, light cycle information indicating an illumination cycle, a light switch timing, and so on of a green light, a yellow light, and a red light, and so on. The wireless communication apparatus 16 is electrically connected to the ECU 50 in order to output signals relating to the read-ahead information to the ECU 50.

The DB 17 stores various information. The DB 17 stores map information including road information, various information obtained and learned during actual travel by the vehicle 2, the read-ahead information obtained by the wireless communication apparatus 16, and so on. The road information includes, for example, road gradient information, road surface condition information, road shape information, speed limit information, road curvature (curve) information, temporary stop information, stop line position information, and so on. The information stored in the DB 17 is referred to appropriately by the ECU 50, whereupon required information is read. Note that here, as shown in the drawing, the DB 17 is installed in the vehicle 2, but the invention is not limited thereto, and the DB 17 may be provided in an information center or the like outside the vehicle 2. In this case, the DB 17 is referred to appropriately by the ECU 50 via wireless communication or the like, whereupon the required information is read. The DB 17 according to this embodiment stores, as learned information, information indicating a position (an actual stop position) in which the vehicle 2 stops at a traffic light, an intersection, or the like provided with a reference stop position such as a stop line. The DB 17 stores the actual stop position information for each reference stop position.

The ECU 50 is a control unit that performs overall control of the vehicle control system 3, and is constituted, for example, by an electronic circuit having a conventional microcomputer including a central processing unit (CPU), a read-only memory (ROM), a random access memory (RAM), and an interface as a main body. Electric signals corresponding to detection results obtained by the vehicle speed sensor 10, the acceleration sensor 11, the yaw rate sensor 12, the accelerator sensor 13, and the brake sensor 14, the GPS information obtained by the GPS apparatus 15, the read-ahead information obtained by the wireless communication apparatus 16, the various information stored in the DB 17, drive signals relating to respective components, control commands, and so on are input into the ECU 50. The ECU 50 controls the HMI apparatus 4, the engine 5, the MG 6, the transmission 7, the brake apparatus 8, the battery 9, and so on in accordance with the input electric signals and so on. For example, the ECU 50 executes drive control of the engine 5, drive control of the MG 6, shift control of the transmission 7, braking control of the brake apparatus 8, and the like on the basis of the accelerator depression amount, the vehicle speed, and so on. Further, for example, the ECU 50 realizes various types of vehicle travel (travel modes) in the vehicle 2 by employing the engine 5 and the MG 6 either together or selectively in accordance with operating conditions.

Furthermore, for example, the ECU 50 can detect an ON/OFF condition and the accelerator depression amount of the accelerator operation serving as the acceleration request operation issued by the driver in relation to the vehicle 2 on the basis of the detection result obtained by the accelerator sensor 13. Similarly, for example, the ECU 50 can detect an ON/OFF condition of the brake operation serving as the braking request operation issued by the driver in relation to the vehicle 2 on the basis of the detection result obtained by the brake sensor 14. Note that when the accelerator operation performed by the driver is in an OFF condition, this means that the driver has canceled the acceleration request operation relating to the vehicle 2, and when the accelerator operation performed by the driver is in an ON condition, this means that the driver is performing the acceleration request operation relating to the vehicle 2. Similarly, when the brake operation performed by the driver is in an OFF condition, this means that the driver has canceled the braking request operation relating to the vehicle 2, and when the brake operation performed by the driver is in an ON condition, this means that the driver is performing the braking request operation relating to the vehicle 2. Further, the ECU 50 detects a driver requested power on the basis of the accelerator depression amount.

An example of a configuration of the ECU 50 will be described in outline below with reference to the block diagram of FIG. 2. As shown in FIG. 2, the ECU 50 includes a vehicle characteristic calculation unit 51, a storage unit 52, and a travel assistance control unit 53. The vehicle characteristic calculation unit 51 and the storage unit 52 are included in the deceleration factor estimation apparatus 1. The deceleration factor estimation apparatus 1 may include, in addition to the ECU 50, various sensors for detecting vehicle conditions and various information acquisition units for supplying peripheral information. Instead of the various sensors for detecting the vehicle conditions and the various information acquisition units for supplying the peripheral information, the deceleration factor estimation apparatus 1 may include a communication unit serving as an acquisition unit that obtains information from the various sensors for detecting the vehicle conditions and the various information acquisition units for supplying the peripheral information. Here, the vehicle characteristic calculation unit 51 and the travel assistance control unit 53 of the ECU 50 are connected via a control area network (CAN) 56, which is constructed as an in-vehicle network, to an actuator ECU and various sensors for controlling various actuators such as an engine control ECU, an MG control ECU, a transmission control ECU, a brake control ECU, and a battery control ECU. The vehicle characteristic calculation unit 51 and the travel assistance control unit 53 obtain control values from the various actuators and detection values from the sensors via the CAN 56 as vehicle information.

The vehicle characteristic calculation unit 51 calculates various characteristics of the vehicle 2. In this embodiment, the vehicle characteristic calculation unit 51 calculates a deceleration factor of the vehicle 2. More specifically, the vehicle characteristic calculation unit 51 obtains various information via the CAN 56, and estimates the deceleration factor of the vehicle 2 by analyzing the obtained information.

The vehicle characteristic calculation unit 51 includes a vehicle speed calculation unit (a speed acquisition unit) 60, an acceleration calculation unit (an acceleration acquisition unit) 61, a driving force calculation unit (a driving force acquisition unit) 62, a vehicle weight calculation unit 63, an air resistance calculation unit 64, a road load calculation unit 65, and an estimation processing control unit 66. In the deceleration factor estimation apparatus 1, the vehicle weight calculation unit 63, air resistance calculation unit 64, road load calculation unit 65, and estimation processing control unit 66 of the vehicle characteristic calculation unit 51 together constitute a deceleration factor estimation unit.

The vehicle speed calculation unit 60, acceleration calculation unit 61, and driving force calculation unit 62 obtain various parameters used to estimate the deceleration factor.

The vehicle speed calculation unit 60 is a calculation unit that obtains the vehicle speed of the vehicle 2. The vehicle speed calculation unit 60 can obtain the vehicle speed of the vehicle 2 by obtaining the detection value of the vehicle speed sensor 10 via the CAN 56. Note that the vehicle speed calculation unit 60 may obtain the detection value obtained by the vehicle speed sensor 10 as is as the vehicle speed of the vehicle 2, or may obtain the vehicle speed of the vehicle 2 by executing calculation processing on the detection value of the vehicle speed sensor 10.

The acceleration calculation unit 61 is a calculation unit that obtains the acceleration of the vehicle 2. The acceleration calculation unit 61 can obtain the acceleration of the vehicle 2 by obtaining the detection value of the acceleration sensor 11 via the CAN 56. Note that the acceleration calculation unit 61 may obtain the detection value obtained by the acceleration sensor 11 as is as the acceleration of the vehicle 2, or may obtain the vehicle speed of the vehicle 2 by executing calculation processing on the detection value of the acceleration sensor 11. Further, the acceleration calculation unit 61 may calculate the acceleration without using the detection value of the acceleration sensor 11. For example, the acceleration calculation unit 61 may obtain the acceleration by differentiating the vehicle speed detected by the vehicle speed sensor 10.

The driving force calculation unit 62 is a calculation unit that obtains the driving force of the vehicle 2. The driving force calculation unit 62 can obtain the driving force of the vehicle 2 by obtaining detection values indicating respective driving conditions of the engine 5 and the MG 6 via the CAN 56 and calculating the detection values. For example, the driving force calculation unit 62 can calculate the driving force of the vehicle 2 by calculating a rotation speed of the engine, an output of the MG 6, and the like on the basis of various conditions. The driving force calculation unit 62 may also obtain the driving force by obtaining and calculating values of loads (engine braking, regenerative braking) generated by the engine 5 and the MG 6 when deceleration is underway but the driver is not performing a brake operation. Further, the driving force calculation unit 62 may obtain the detection value of the accelerator sensor 13, or in other words the accelerator depression amount, via the CAN 56, and obtain the driving force of the vehicle 2 from the obtained accelerator depression amount.

The vehicle weight calculation unit 63 is a calculation unit that estimates the vehicle weight. The air resistance calculation unit 64 is a calculation unit that estimates an air resistance coefficient. The road load calculation unit 65 is a calculation unit that estimates a road load. Calculations executed by the vehicle weight calculation unit 63, the air resistance calculation unit 64, and the road load calculation unit 65 will be described below. Here, the road load (a travel resistance) is resistance generated between the drive source and the road surface, and includes road surface resistance generated between a tire and the road surface, resistance (mechanical loss) generated by a driving system that transmits the driving force generated by the drive source, and so on. Hence, in the vehicle characteristic calculation unit 51 according to this embodiment, the vehicle weight, the air resistance coefficient, and the road load estimated respectively by the vehicle weight calculation unit 63, the air resistance calculation unit 64, and the road load calculation unit 65 serve as deceleration factors.

The estimation processing control unit 66 controls processing executed by the respective units of the vehicle characteristic calculation unit 51. The estimation processing control unit 66 determines, on the basis of the vehicle speed obtained by the vehicle speed calculation unit 60 and the acceleration obtained by the acceleration calculation unit 61, whether or not to have the vehicle weight calculation unit 63 execute processing to estimate the vehicle weight, whether or not to have the air resistance calculation unit 64 execute processing to estimate the air resistance coefficient, and whether or not to have the road load calculation unit 65 execute processing to estimate the road load, and on the basis of these determinations causes the respective units to execute the processing to estimate the various deceleration factors. This point will be described below.

The storage unit 52 stores values calculated by the vehicle characteristic calculation unit 51 and values required for various calculations. The storage unit 52 stores at least currently calculated estimated values of the deceleration factors. Note that in this embodiment, the storage unit 52 is provided in the ECU 50, but the required information may be stored in the DB 17.

The travel assistance control unit 53 is an intelligent transport systems (ITSs) compatible calculation unit, for example, and includes a calculation unit for performing infrastructure cooperation and NAVI cooperation. The travel assistance control unit 53 executes read-ahead information eco-driving assistance processing using so-called read-ahead information. In other words, in the vehicle control system 3, the travel assistance control unit 53 assists eco-driving by employing the read-ahead information to implement driving having a superior fuel efficiency improvement effect. As a result, the vehicle control system 3 can suppress fuel consumption so as to achieve an improvement in fuel efficiency. To assist eco-driving by the driver, the travel assistance control unit 53 outputs driving assistance information to the HMI apparatus 4 in order to guide the operations performed by the driver. As further travel assistance, the travel assistance control unit 53 switches the engine ON and OFF when travel is stopped.

The travel assistance control unit 53 obtains information indicating a future travel route of the vehicle 2 on the basis of various information obtained via the CAN 56, for example the position information obtained by the GPS apparatus 15, the light cycle of a traffic light through which the vehicle 2 passes, obtained by the wireless communication apparatus 16, and so on. Further, the travel assistance control unit 53 obtains the current travel conditions (the vehicle speed, remaining battery capacity, and so on) via the CAN 56. The travel assistance control unit 53 can then execute travel assistance using the information indicating the future travel route and current travel conditions of the vehicle 2 and the respective deceleration factors calculated by the deceleration factor estimation apparatus 1.

The travel assistance control unit 53 executes various types of travel assistance by controlling the engine 5 in accordance with conditions, and in so doing provides assistance to realize travel that has a superior fuel efficiency improvement effect and is comfortable for the driver. More specifically, the travel assistance control unit 53 obtains information indicating the stop position of a traffic light, an intersection, or the like, and determines whether or not it is necessary to stop in the travel direction. Having determined to stop the vehicle 2, the travel assistance control unit 53 specifies a target stop position from the information indicating the position of the stop line of the traffic light, intersection, or the like, and controls the ON/OFF condition of the engine 5 on the basis of the travel speed of the traveling vehicle 2, a distance to the subject target stop position, and a driver-requested power input in accordance with the operation performed by the driver.

Furthermore, the travel assistance control unit 53 prompts the driver to perform driving having a superior fuel efficiency improvement effect by controlling the HMI apparatus 4 in accordance with conditions to output various driving assistance information. The travel assistance control unit 53 issues guidance to prompt the driver to perform a recommended driving operation, typically a driving operation accompanying a change, by causing the HMI apparatus 4 to output the various driving assistance information on the basis of a target travel state quantity of the traveling vehicle 2. Here, the target travel state quantity is typically a target travel state quantity of the vehicle 2 at a predetermined location of the traveling vehicle 2 or a predetermined timing. The travel assistance control unit 53 performs assistance to prompt the driver to perform the recommended driving operation by controlling the HMI apparatus 4 on the basis of the target travel state quantity at the predetermined location or the predetermined timing such that the driving assistance information is output from the HMI apparatus 4, and in so doing provides driving assistance for ensuring that the travel state quantity of the vehicle 2 matches the target travel state quantity at the predetermined location and timing.

Figure 3:
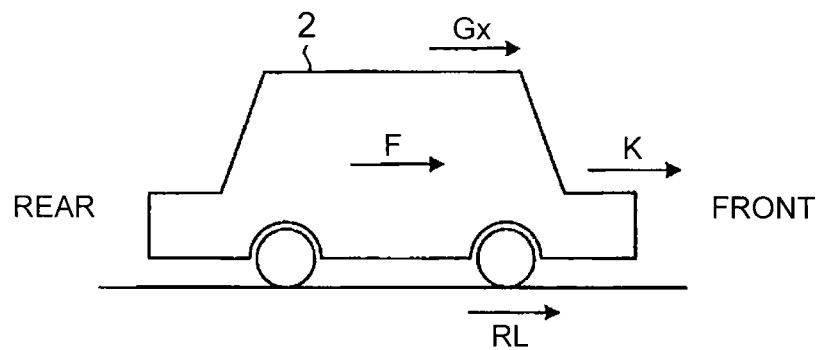
FIG. 3 is a schematic illustrative view showing a force acting on a vehicle.

Next, using FIGS. 3 to 10, an example of the processing executed by the deceleration factor estimation apparatus 1 will be described. First, the deceleration factors estimated by the deceleration factor estimation apparatus 1 will be described. FIG. 3 is a schematic illustrative view showing a force acting on the vehicle. When the force acting on the vehicle 2 during travel is applied to an equation of motion, Equation 1 shown below is obtained.

[Math. 1]

$$F = Gx \cdot M + K \cdot Vx^2 + RL \qquad \text{(Equation 1)}$$

Here, F is the driving force, Gx is the acceleration, M is the vehicle weight, K is the air resistance coefficient, Vx is the vehicle speed, and RL is the road load. Note that when the vehicle 2 is traveling forward at the vehicle speed Vx, the respective parameters of the above equation have a normal orientation, as indicated by arrows in FIG. 3. Further, when the driving force F is generated by the drive source of the vehicle 2 during travel, the air resistance and the road load are basically generated in an opposite direction to the direction of the driving force F of the vehicle 2, or in other words a direction for decelerating the vehicle 2, and therefore values of K and RL are basically negative values. Furthermore, as the weight M increases, the acceleration decreases.

By determining four of the five terms in Equation 1, the deceleration factor estimation apparatus 1 can calculate the value of the remaining term. Here, the acceleration Gx, the vehicle speed Vx, and the driving force F of the terms in the above equation are terms that can be obtained by obtaining or calculating the respective detection values of the vehicle. Therefore, by determining the values of two deceleration factors from among the vehicle weight M, the air resistance coefficient K, and the road load RL, the deceleration factor estimation apparatus 1 can estimate the value of the remaining deceleration factor.

Here, the estimation processing control unit 66 of the deceleration factor estimation apparatus 1 according to this embodiment determines the deceleration factor term to be estimated on the basis of the acceleration Gx and the vehicle speed Vx. In other words, when the acceleration Gx and the vehicle speed Vx satisfy a predetermined condition, the estimation processing control unit 66 performs processing to estimate a deceleration factor that satisfies the condition. When the acceleration Gx and the vehicle speed Vx do not satisfy the deceleration factor estimation condition, therefore, the estimation processing control unit 66 does not perform the deceleration factor estimation processing.

Figure 4:
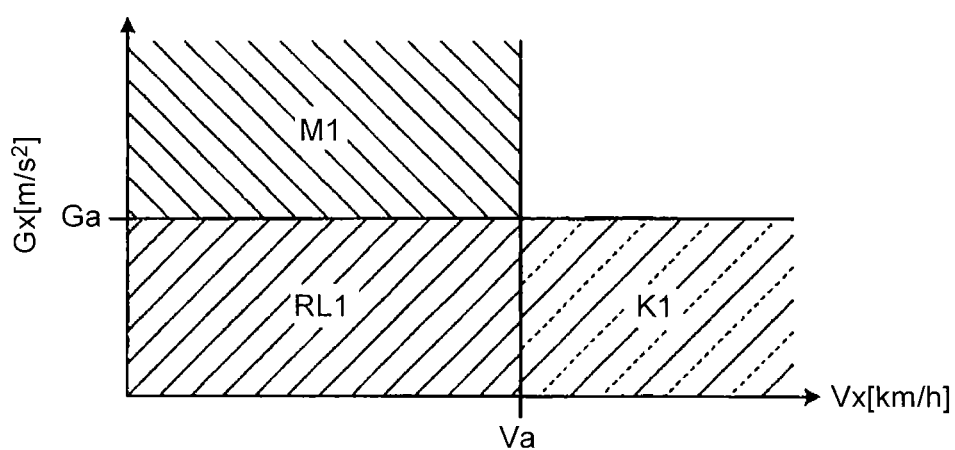
FIG. 4 is an illustrative view showing a relationship between an estimated deceleration factor, a speed, and an acceleration.

FIG. 4 is an illustrative view showing a relationship between the deceleration factor to be estimated, the speed, and the acceleration. In FIG. 4, the acceleration Gx [m/s$^2$] is shown on the ordinate and the vehicle speed Vx [km/h] is shown on the abscissa. Further, an acceleration Ga and a speed Va serve as thresholds. For example, the acceleration Ga and the speed Va may be set at 1.0 and 50.0, respectively.

When the acceleration Gx is higher than Ga and the vehicle speed Vx is lower than Va, the estimation processing control unit 66 estimates a vehicle weight M1 from among the deceleration factors. Here, M1 is an estimated vehicle weight. The vehicle weight M1 is calculated using Equation 2 shown below.

[Math. 2]

$$M1 = \frac{F - K \cdot Vx^2 - RL}{Gx} \qquad \text{(Equation 2)}$$

When the acceleration Gx is higher than Ga and the vehicle speed Vx is lower than Va, a Vx$^2$ term is smaller than the acceleration Gx term, and therefore an effect of the Vx$^2$ term of the above equation decreases. Further, since the acceleration Gx is higher than Ga, RL has a relatively small effect. Hence, when the acceleration Gx is higher than Ga and the vehicle speed Vx is lower than Va, the estimation processing control unit 66 can estimate the vehicle weight M1 while reducing effects of errors in the other deceleration factors. K and RL take currently calculated estimated values (previous values) read from the storage unit 52.

When the acceleration Gx is lower than Ga and the vehicle speed Vx is higher than Va, the estimation processing control unit 66 estimates an air resistance coefficient K1 from among the deceleration factors. Here, K1 is an estimated air resistance coefficient. The air resistance coefficient K1 is calculated using Equation 3 shown below.

[Math. 3]

$$K1 = \frac{F - Gx \cdot M - RL}{Vx^2} \qquad \text{(Equation 3)}$$

When the acceleration Gx is lower than Ga and the vehicle speed Vx is higher than Va, the effect of the Gx term in the above equation on the Vx$^2$ term decreases. Further, since the vehicle speed Vx is higher than Va, RL also has a relatively small effect. Hence, when the acceleration Gx is lower than Ga and the vehicle speed Vx is higher than Va, the estimation processing control unit 66 can estimate the air resistance coefficient K1 while reducing the effects of errors in the other deceleration factors. M and RL take currently calculated estimated values (previous values) read from the storage unit 52.

When the acceleration Gx is lower than Ga and the vehicle speed Vx is lower than Va, the estimation processing control unit 66 estimates a road load RL1 from among the deceleration factors. Here, RL1 is an estimated road load. The road load RL1 is calculated using Equation 4 shown below.

[Math. 4]

$$RL1 = F - Gx \cdot M - K \cdot Vx^2 \quad \text{(Equation 4)}$$

When the acceleration Gx is lower than Ga and the vehicle speed Vx is lower than Va, both the $Vx^2$ term and the Gx term have a reduced effect on F. Hence, when the acceleration Gx is lower than Ga and the vehicle speed Vx is lower than Va, the estimation processing control unit 66 can estimate the road load RL1 while reducing the effects of errors in the other deceleration factors. M and K take currently calculated estimated values (previous values) read from the storage unit 52.

Figure 5:
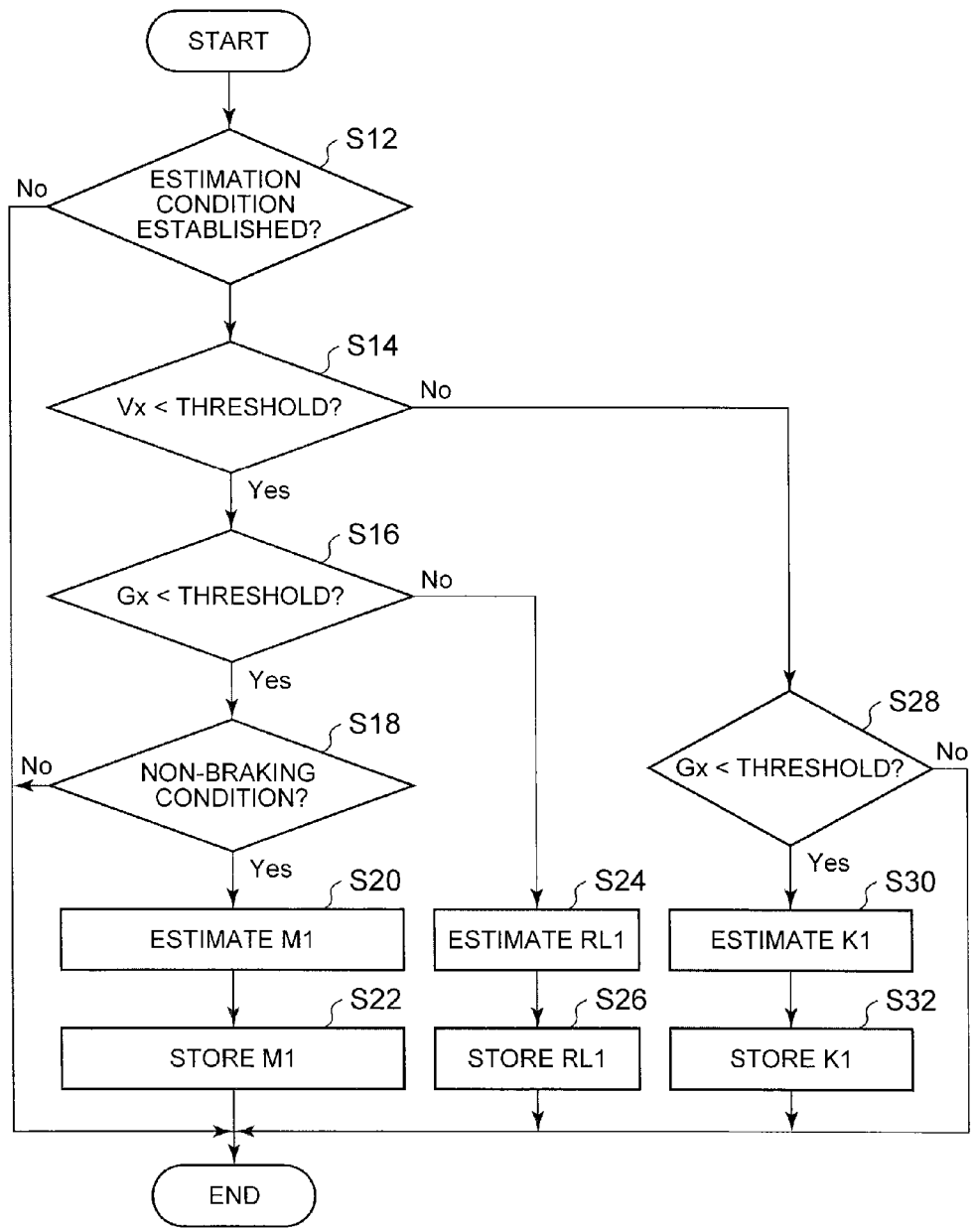
FIG. 5 is a flowchart showing an example of control executed by the ECU.

Next, using FIG. 5, an example of processing procedures executed by the estimation processing control unit 66 will be described. FIG. 5 is a flowchart showing an example of the control executed by the ECU 50. The estimation processing control unit 66 can execute the processing shown in FIG. 5 by performing various processing determinations on the basis of the values calculated by the respective units of the vehicle characteristic calculation unit 51 and the conditions of the vehicle 2 obtained from the CAN 56 in order to control operations of the respective units of the vehicle characteristic calculation unit 51.

In step S12, the estimation processing control unit 66 determines whether or not an estimation condition is established. Here, the estimation condition is determined on the basis of a shift position, the vehicle speed, and the yaw rate. Note that the shift position can be obtained by detecting the condition of the transmission 7 via the CAN 56. The estimation processing control unit 66 determines that the estimation condition is established when conditions according to which the shift position is a drive position, the vehicle speed Vx is higher than 0 (0<V), and a yaw rate YR is smaller than a threshold (YR<threshold) are all satisfied. In other words, the estimation processing control unit 66 determines that the estimation condition is established when driving force transmission from the drive source is underway, and the vehicle 2 is in motion but not turning at or above the threshold. When the estimation processing control unit 66 determines in step S12 that the estimation condition is not established (No), the current processing is terminated.

After determining in step S12 that the estimation condition is established (Yes), the estimation processing control unit 66 determines in step S14 whether or not vehicle speed Vx<threshold is established, or in other words whether or not the vehicle speed Vx is smaller than the threshold (the speed Va, for example). The estimation processing control unit 66 advances to step S16 after determining in step S14 that vehicle speed Vx<threshold is established (Yes) and advances to step S28 after determining that vehicle speed Vx<threshold is not established (No), or in other words that vehicle speed Vx ≥threshold is established.

After determining Yes in step S14, the estimation processing control unit 66 determines in step S16 whether or not acceleration Gx<threshold is established, or in other words whether or not the acceleration Gx is smaller than the threshold (the acceleration Ga, for example). The estimation processing control unit 66 advances to step S18 after determining in step S16 that acceleration Gx<threshold is established (Yes) and advances to step S24 after determining that acceleration Gx<threshold is not established (No), or in other words that acceleration Gx ≥threshold is established.

After determining Yes in step S16, the estimation processing control unit 66 determines in step S18 whether or not a non-braking condition is established. In other words, the estimation processing control unit 66 determines whether or not a brake operation has been detected by the brake sensor 14. After determining in step S18 that the non-braking condition is not established (No), or in other words that a brake operation has been detected by the brake sensor, the estimation processing control unit 66 terminates the current processing. In other words, when a braking operation is underway, the estimation processing control unit 66 terminates the current processing without performing estimation. After determining in step S18 that the non-braking condition is established (Yes), or in other words that a brake operation has not been detected by the brake sensor, the estimation processing control unit 66 estimates the vehicle weight M1 in step S20. Here, the vehicle weight M1 is estimated by the vehicle weight calculation unit 63 using the above equation. Once the vehicle weight M1 has been estimated in step S20, the estimation processing control unit 66 stores the estimated vehicle weight M1 in the storage unit 52 in step S22, whereupon the current processing is terminated.

After determining No in step S16, the estimation processing control unit 66 estimates the road load RL1 in step S24. Here, the road load RL1 is estimated by the road load calculation unit 65 using the above equation. Once the road load RL1 has been estimated in step S24, the estimation processing control unit 66 stores the road load RL1 in the storage unit 52 in step S26, whereupon the current processing is terminated.

After determining No in step S14, the estimation processing control unit 66 determines in step S28 whether or not acceleration Gx<threshold is established, or in other words whether or not the acceleration Gx is smaller than the threshold (the acceleration Ga, for example). After determining in step S28 that acceleration Gx<threshold is not established (No), or in other words that acceleration Gx≥threshold is established, the estimation processing control unit 66 terminates the current processing.

After determining in step S28 that acceleration Gx<threshold is established (Yes), the estimation processing control unit 66 estimates the air resistance coefficient K1 in step S30. Here, the air resistance coefficient K1 is estimated by the air resistance calculation unit 64 using the above equation. Once the air resistance coefficient K1 has been estimated in step S30, the estimation processing control unit 66 stores the air resistance coefficient K1 in the storage unit 52 in step S32, and then terminates the current processing.

By switching the deceleration factor to be estimated on the basis of the vehicle speed Vx and the acceleration Gx, the deceleration factor estimation apparatus 1 can calculate the vehicle weight M1, the air resistance coefficient K1, and the road load RL1 serving as the estimation subjects respectively in a condition where effects from the other deceleration factors are reduced. As a result, the deceleration factor estimation apparatus 1 can calculate the respective deceleration factors with a higher degree of precision. When the deceleration factor estimation apparatus 1 estimates the vehicle weight M1, the air resistance coefficient K1, and the road load RL1 serving as the estimation subjects, the effect of an error included in another deceleration factor can be reduced. As a result, the possibility of an error in the estimated deceleration factor due to the effects from the other deceleration factors can be reduced.

Further, by switching the deceleration factor to be estimated on the basis of the vehicle speed Vx and the acceleration Gx, the deceleration factor estimation apparatus 1 can prevent a situation in which the estimated values of the vehicle weight M1, the air resistance coefficient K1, and the road load RL1 include values calculated in a condition where the effects from the other deceleration factors are large. As a result, the possibility of an error in the estimated deceleration factor due to the effects from the other deceleration factors can be reduced, and therefore the deceleration factors can be estimated with a high degree of precision.

Here, the deceleration factor estimation apparatus 1, when executing deceleration factor estimation, preferably calculates a corrected estimated value by taking into account a past estimated value of the calculated estimated value. Further, the deceleration factor estimation apparatus 1 preferably uses the corrected estimated value as a value of the deceleration factor used by another apparatus such as the travel assistance control unit 53. For example, a corrected estimated value of the vehicle weight M1 is preferably calculated using Equation 5 shown below.

[Math. 5]

$$M1\_F = (1-kk) \cdot M1_{n-1} + kk \cdot M1_n \quad \text{(Equation 5)}$$

M1_F is a corrected estimated value, $M1_{n-1}$ is a previous estimated value, and $M1_n$ is a current estimated value. Further, kk is a weighting coefficient. Note that when the corrected estimated value M1_F of the vehicle weight is calculated, a filter time constant is preferably set as a short period filter. For example, a filter time constant having a period of 60 s is preferably used.

Figure 6:
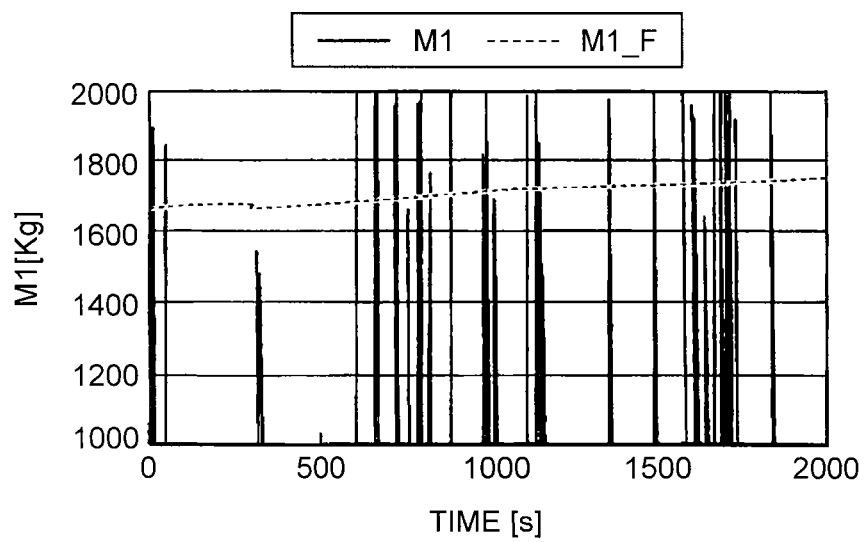
FIG. 6 is an illustrative view showing a relationship between a calculation result of a vehicle weight and time.

FIG. 6 shows a relationship between calculated M1 and M1_F. FIG. 6 is an illustrative view showing a relationship between a calculation result of the vehicle weight and time. Note that the example shown in FIG. 6 is an example of a case in which M1 is 1800 kg. As shown in FIG. 6, the deceleration factor estimation apparatus 1 can calculate an estimated value having a higher degree of precision by calculating the corrected estimated value M1_F, which is obtained by correcting the current estimated value using the previous estimated value.

Further, a corrected estimated value K1_F of the air resistance coefficient K1 is preferably calculated using Equation 6 shown below.

[Math. 6]

$$K1\_F = (1 \cdot kk) \cdot K1_{n-1} + kk \cdot K1_n \quad \text{(Equation 6)}$$

K1_F is the corrected estimated value, $K1_{n-1}$ is a previous estimated value, and $K1_n$ is a current estimated value. Further, kk is a weighting coefficient. Note that when the corrected estimated value K1_F of the air resistance coefficient is calculated, a filter time constant is preferably set as a long period filter. For example, a filter time constant having a period of 600 s is preferably used.

Figure 7:
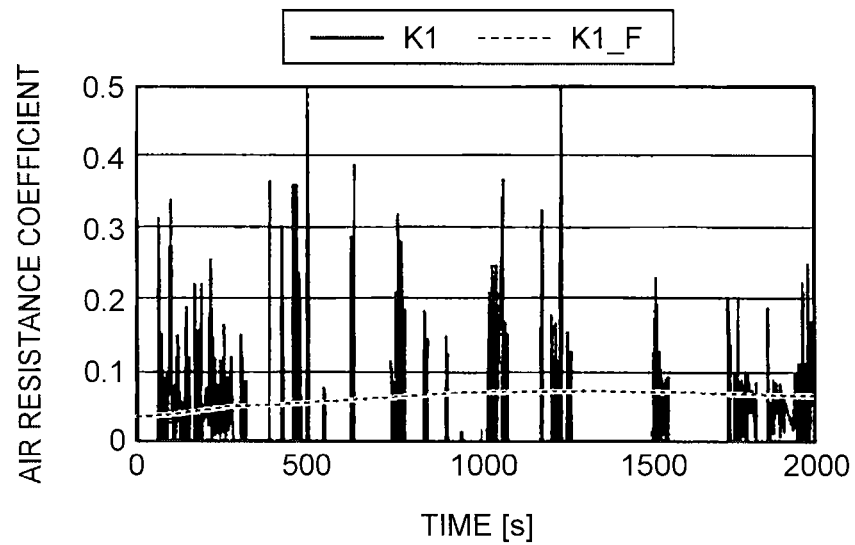
FIG. 7 is an illustrative view showing a relationship between a calculation result of an air resistance coefficient and time.

FIG. 7 shows a relationship between calculated K1 and K1_F. FIG. 7 is an illustrative view showing a relationship between a calculation result of the air resistance coefficient and time. As shown in FIG. 7, the deceleration factor estimation apparatus 1 can calculate an estimated value having a higher degree of precision by calculating the corrected estimated value K1_F, which is obtained by correcting the current estimated value using the previous estimated value.

Furthermore, a corrected estimated value of the road load RL1 is preferably calculated using Equation 7 shown below.

[Math. 7]

$$RL1\_F = (1-kk) \cdot RL1_{n-1} + kk \cdot RL1_n \quad \text{(Equation 7)}$$

RL1_F is the corrected estimated value, $RL1_{n-1}$ is a previous estimated value, and $RL1_n$ is a current estimated value. Further, kk is a weighting coefficient. Note that when the corrected estimated value RL1_F of the road load is calculated, a filter time constant is preferably set as an intermediate period filter. For example, a filter time constant having a period of 300 s is preferably used.

Figure 8:
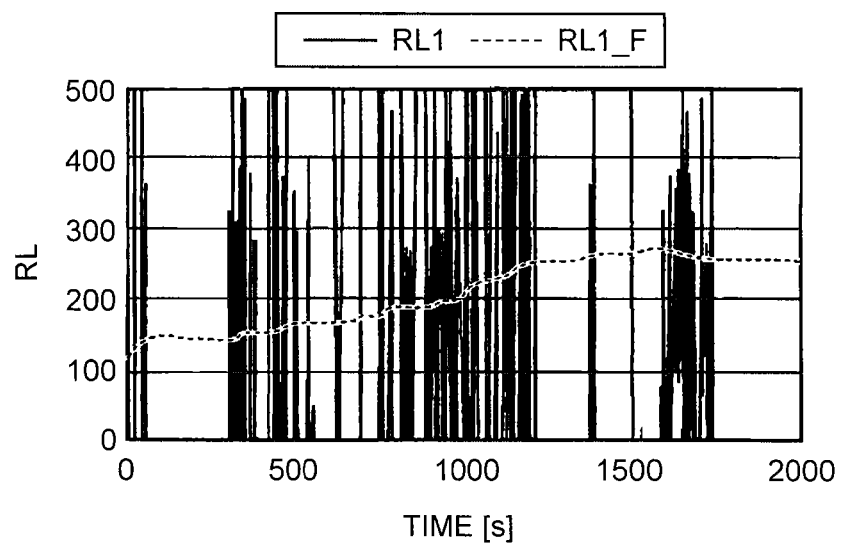
FIG. 8 is an illustrative view showing a relationship between a calculation result of a road load and time.

FIG. 8 shows a relationship between calculated RL1 and RL1_F. FIG. 8 is an illustrative view showing a relationship between a calculation result of the road load and time. As shown in FIG. 8, the deceleration factor estimation apparatus 1 can calculate an estimated value having a higher degree of precision by calculating the corrected estimated value RL1_F, which is obtained by correcting the current estimated value using the previous estimated value.

As shown in FIGS. 6 to 8 and Equations 5 to 7, the deceleration factor estimation apparatus 1 can calculate estimated values having a higher degree of precision by correcting the estimated values. Further, by setting the filter time constants used for the respective deceleration factors at different time constants when calculating the estimated values, estimated values having an even higher degree of precision can be calculated.

When correcting the estimated value of the vehicle weight, the deceleration factor estimation apparatus 1 can perform corrections corresponding to variation factors of the vehicle weight by implementing filter processing using a short period filter. More specifically, corrections can be made in response to variation occurring within a short period, such as variation in a number of passengers and movement of a carried load.

When correcting the estimated value of the air resistance coefficient, the deceleration factor estimation apparatus 1 can perform corrections corresponding to variation factors of the air resistance coefficient by implementing filter processing using a long period filter. More specifically, corrections can be made in response to variation occurring over a long period, such as replacement of body kit and other vehicle-exterior fittings, or in other words variation that, having occurred once, does not change greatly for a long time.

Figure 9:
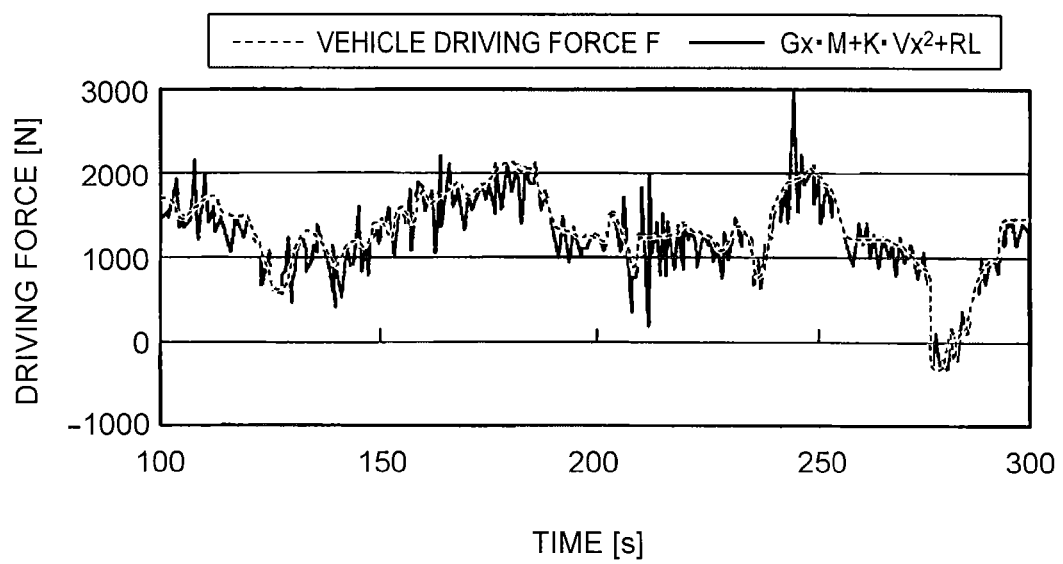
FIG. 9 is an illustrative view showing a relationship between a calculation result of a driving force and time.

Next, a case in which the driving force is calculated using an equation of motion that takes the deceleration factors described above into account will be described. FIG. 9 is an illustrative view showing a relationship between a calculation result of the driving force and time. In FIG. 9, a driving force [N] is shown on the ordinate and time [s] is shown on the abscissa. Further, FIG. 9 shows a driving force (a vehicle driving force) F calculated by measurement, and a driving force (G×x M+K×V²+RL) calculated by inserting respective values into the right side of Equation 1. Here, G×x M +K×V²+RL shown in FIG. 9 is calculated using a standard weight as M, a standard air resistance coefficient as K, a standard road load as RL, the detection value of the acceleration sensor 11 as Gx, and the detection value of the vehicle speed sensor 10 as V. Here, the standard air resistance coefficient K is calculated from air density ρ×front surface projected surface area S×air resistance coefficient cd. Further, the standard road load RL is calculated from a tire rolling resistance Rr and a vehicle mechanical loss Mr. In other words, FIG. 9 shows a condition in which the deceleration factors are constant, or in other words a case in which the driving force is calculated using substantially accurate deceleration factor values.

As shown in FIG. 9, by calculating the driving force from an equation using deceleration factors calculated to a high degree of precision, a value that is close to the actual driving force can be calculated. Hence, the deceleration factor estimation apparatus 1 according to this embodiment can calculate a driving force that is close to an actual value by estimating the deceleration factors with a high degree of precision. The deceleration factor estimation apparatus 1 can calculate a relationship between the driving force, the acceleration, and the speed during travel accurately by increasing the precision of the deceleration factor terms in Equation 1. As a result, when travel behavior of the vehicle is predicted during travel assistance, the travel behavior can be predicted accurately. By predicting the travel behavior accurately, travel assistance can be executed more appropriately.

Here, when the detection value of the acceleration sensor 11 is used, the deceleration factor estimation apparatus 1 preferably uses a value obtained by correcting the detection value using a low pass filter as the acceleration. In other words, an acceleration GxF corrected in accordance with Equation 8, shown below, is preferably used.

[Math. 8]

$$GxF = (1-kk) \cdot Gx_{n-1} + kk \cdot Gx_n \quad \text{(Equation 8)}$$

Figure 10:
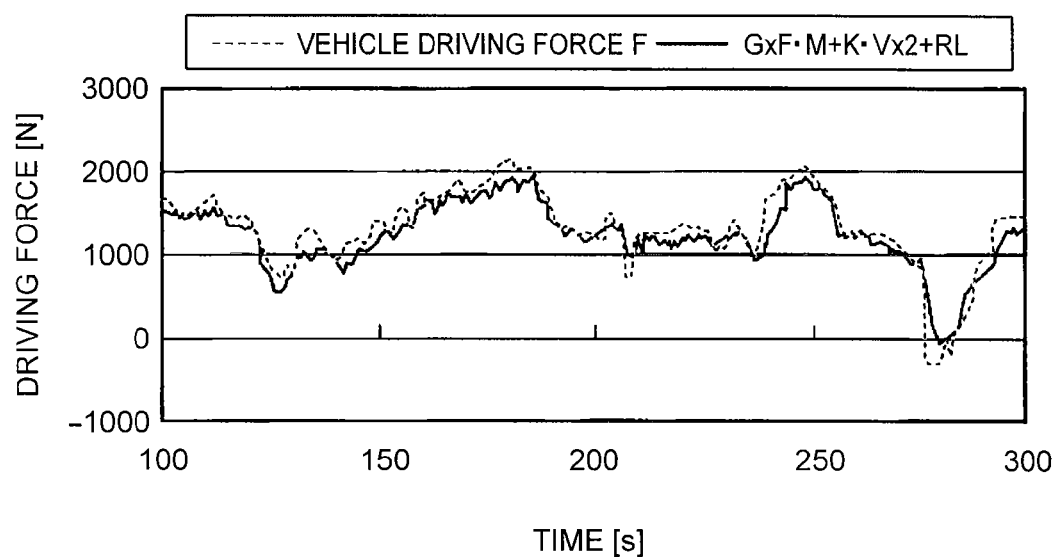
FIG. 10 is an illustrative view showing the relationship between the calculation result of the driving force and time.

Here, FIG. 10 is an illustrative view showing the relationship between the calculation result of the driving force and time. In FIG. 10, the driving force [N] is shown on the ordinate and time [s] is shown on the abscissa. Further, FIG. 10 shows the driving force F calculated by measurement, and a driving force $(GxF \times M + K \times V^2 + RL)$ calculated by inserting respective values into the right side of Equation 1. In other words, in FIG. 10, a value from which a high frequency component has been removed using a low pass filter is used as the acceleration in the driving force calculated by inserting respective values into the right side of Equation 1. By employing a value from which the high frequency component has been removed, as shown in FIG. 10, the deceleration factor estimation apparatus 1 can estimate the deceleration factors using values from which a noise component has been removed. As a result, the deceleration factors can be estimated with an even higher degree of precision.

The deceleration factor estimation apparatus 1 according to this embodiment can calculate the deceleration factors with a higher degree of precision by calculating all three deceleration factors, namely the vehicle weight, the air resistance coefficient, and the road load, by estimation. Here, the deceleration factor estimation apparatus 1 is not limited to calculating all three deceleration factors, namely the vehicle weight, the air resistance coefficient, and the road load, by estimation. Instead, the deceleration factor estimation apparatus 1 may estimate only two or only one of the vehicle weight, the air resistance coefficient, and the road load. Note that preset fixed values or design values are used for the values that are not estimated. By switching between estimation of the air resistance coefficient and estimation of the road load in accordance with the travel conditions, the deceleration factor estimation apparatus 1 can estimate the deceleration factors with an even higher degree of precision.

The deceleration factor estimation apparatus 1 determines whether or not to estimate the respective deceleration factors using the acceleration and the speed as reference travel conditions, but a determination reference for determining whether or not to estimate the respective deceleration factors is not limited thereto, and the deceleration factor estimation apparatus 1 may determine whether or not to estimate the respective deceleration factors using only one of the acceleration and the speed as a reference travel condition. Further, the deceleration factor estimation apparatus 1 may determine whether or not to provide travel assistance using the driving force as a reference travel condition.

The deceleration factor estimation apparatus 1 switches between estimating the vehicle weight and estimating the road load using a single threshold (the acceleration) as a reference, and switches between estimating the air resistance coefficient and estimating the road load using a single threshold (the acceleration) as a reference. However, the deceleration factor estimation apparatus 1 is not limited thereto, and may use different accelerations as a threshold for determining whether or not to estimate the vehicle weight and a threshold for determining whether or not to estimate the road load. The deceleration factor estimation apparatus 1 may also use different speeds as a threshold for determining whether or not to estimate the air resistance coefficient and the threshold for determining whether or not to estimate the road load. Furthermore, the deceleration factor estimation apparatus 1 may estimate both the vehicle weight and the road load at certain accelerations, and estimate neither the vehicle weight nor the road load at certain accelerations. The deceleration factor estimation apparatus 1 may also estimate both the air resistance coefficient and the road load at certain speeds, and estimate neither the air resistance coefficient nor the road load at certain speeds.

To improve the estimation precision, the deceleration factor estimation apparatus 1 preferably switches between estimating the three deceleration factors, namely the vehicle weight, the air resistance coefficient, and the road load, in accordance with the travel conditions. However, the deceleration factor estimation apparatus 1 is not limited thereto, and may estimate a part of the three deceleration factors, namely the vehicle weight, the air resistance coefficient, and the road load, at all times regardless of the travel conditions. In this case, when one deceleration factor is estimated, a previous value is used for another deceleration factor, and the two calculations are executed separately.

Note that the deceleration factor estimation apparatus 1 according to the embodiment described above is not limited to the above embodiment, and may be subjected to various modifications within the scope of the claims. The deceleration factor estimation apparatus 1 according to this embodiment may be configured by appropriately combining constituent elements of the embodiments described above.

In the above description, the deceleration factor estimation apparatus 1 is described as outputting the driving assistance information for prompting an accelerator OFF operation and a brake ON operation in the form of visual information. However, the deceleration factor estimation apparatus 1 is not limited thereto, and may output the driving assistance information in the form of voice information, sensory information, and so on, for example. In this case, the voice information and sensory information may be varied in form as appropriate.

The deceleration factor estimation apparatus 1 according to this embodiment is described as assisting travel by the vehicle 2 that includes the engine 5 and the MG 6, i.e. a so-called hybrid vehicle. However, the deceleration factor estimation apparatus 1 is not limited thereto, and may provide similar assistance to travel by the vehicle 2 including only the engine 5 as a power supply and not including the MG 6 as a power supply, i.e. a so-called conventional vehicle. Furthermore, the deceleration factor estimation apparatus 1 may provide similar assistance to travel by the vehicle 2 including only a MG as a power supply and not including the engine 5 as a power supply, i.e. a so-called electric vehicle.

1 deceleration factor estimation apparatus
2 vehicle
3 vehicle control system
4 HMI apparatus (assistance apparatus)
5 engine (internal combustion engine)
6 MG (motor)
7 transmission
8 brake apparatus 9 battery
10 vehicle speed sensor
11 acceleration sensor
12 yaw rate sensor
13 accelerator sensor
14 brake sensor
15 GPS apparatus
16 wireless communication apparatus
17 DB
50 ECU
51 vehicle characteristic calculation unit
52 storage unit
53 travel assistance control unit
56 CAN
60 vehicle speed calculation unit
61 acceleration calculation unit
62 driving force calculation unit
63 vehicle weight calculation unit
64 air resistance calculation unit
65 road load calculation unit
66 estimation processing control unit

The invention claimed is:

1. A deceleration factor estimation apparatus, comprising:
a driving force acquisition unit that obtains a driving force of a vehicle;
a speed acquisition unit that obtains a speed of the vehicle;
an acceleration acquisition unit that obtains an acceleration of the vehicle; and
a deceleration factor estimation unit that estimates a particular deceleration factor of a plurality of different deceleration factors on the basis of a relationship between the driving force, the speed, and the acceleration, wherein
the deceleration factor estimation unit switches the particular deceleration factor to be estimated from one of the plurality of different deceleration factors to another of the plurality of different deceleration factors on the basis of the speed and the acceleration, and
the particular deceleration factor is used to assist travel by the vehicle.

2. The deceleration factor estimation apparatus according to claim 1, wherein
the plurality of different deceleration factors include a vehicle weight, and
the deceleration factor estimation unit sets the vehicle weight as the particular deceleration factor to be estimated when the speed is lower than a threshold and the acceleration is higher than a threshold.

3. The deceleration factor estimation apparatus according to claim 1, wherein
the plurality of different deceleration factors include an air resistance coefficient, and
the deceleration factor estimation unit sets the air resistance coefficient as the particular deceleration factor to be estimated when the speed is higher than a threshold and the acceleration is lower than a threshold.

4. The deceleration factor estimation apparatus according to claim 1, wherein
the plurality of different deceleration factors include a road load, and
the deceleration factor estimation unit sets the road load as the particular deceleration factor to be estimated when the speed is lower than a threshold and the acceleration is lower than a threshold.

5. The deceleration factor estimation apparatus according to claim 1, wherein the plurality of different deceleration factors include a vehicle weight, an air resistance coefficient, and a road load, and
the deceleration factor estimation unit estimates the particular deceleration factor to be estimated by analyzing a relationship between the plurality of different deceleration factors, the driving force, the speed, and the acceleration using an equation of motion.

6. The deceleration factor estimation apparatus according to claim 5, wherein the deceleration factor estimation unit uses set values for the deceleration factors of the plurality of different deceleration factors other than the particular deceleration factor to be estimated in the equation of motion.

7. A deceleration factor estimation apparatus comprising:
a driving force acquisition unit that obtains a driving force of a vehicle;
a speed acquisition unit that obtains a speed of the vehicle;
an acceleration acquisition unit that obtains an acceleration of the vehicle; and
a deceleration factor estimation unit that estimates a particular deceleration factor of a plurality of different deceleration factors on the basis of a relationship between the driving force, the speed, and the acceleration, wherein
the deceleration factor estimation unit switches the particular deceleration factor to be estimated from one of the plurality of different deceleration factors to another of the plurality of different deceleration factors on the basis of at least one of the speed and the acceleration,
the plurality of different deceleration factors includes an air resistance coefficient,
the deceleration factor estimation unit sets the air resistance coefficient as the particular deceleration factor to be estimated when a travel condition of the vehicle satisfies a set condition, and
the particular deceleration factor is used to assist travel by the vehicle.

8. The deceleration factor estimation apparatus according to claim 7, wherein the set condition of the travel condition of the vehicle is satisfied when the speed is higher than a threshold.

9. The deceleration factor estimation apparatus according to claim 7, wherein the set condition of the travel condition of the vehicle is satisfied when the acceleration is equal to or lower than a threshold.

10. The deceleration factor estimation apparatus according to claim 7, wherein
the plurality of different deceleration factors include a vehicle weight, the air resistance coefficient, and a road load, and
the deceleration factor estimation unit estimates particular deceleration factor to be estimated by analyzing a relationship between the plurality of different deceleration factors, the driving force, the speed, and the acceleration using an equation of motion.

11. The deceleration factor estimation apparatus according to claim 10, wherein the deceleration factor estimation unit uses set values for the deceleration factors of the plurality of different deceleration factors other than the particular deceleration factor to be estimated in the equation of motion.

12. A deceleration factor estimation apparatus comprising:
a driving force acquisition unit that obtains a driving force of a vehicle;
a speed acquisition unit that obtains a speed of the vehicle;

an acceleration acquisition unit that obtains an acceleration of the vehicle; and a deceleration factor estimation unit that estimates a particular deceleration factor of a plurality of different deceleration factors on the basis of a relationship between the driving force, the speed, and the acceleration, wherein the deceleration factor estimation unit switches the particular deceleration factor to be estimated from one of the plurality of different deceleration factors to another of the plurality of different deceleration factors on the basis of at least one of the speed and the acceleration, the plurality of different deceleration factors includes a road load, the deceleration factor estimation unit sets the road load as the particular deceleration factor to be estimated when a travel condition of the vehicle satisfies a set condition, and the particular deceleration factor is used to assist travel by the vehicle.

13. The deceleration factor estimation apparatus according to claim 12, wherein the set condition of the travel condition of the vehicle is satisfied when the speed is lower than a threshold.

14. The deceleration factor estimation apparatus according to claim 12, wherein the set condition of the travel condition of the vehicle is satisfied when the acceleration is higher than a threshold.

15. The deceleration factor estimation apparatus according to claim 12, wherein the plurality of different deceleration factors include a vehicle weight, an air resistance coefficient, and the road load, and the deceleration factor estimation unit estimates the particular deceleration factor to be estimated by analyzing a relationship between the plurality of different deceleration factors, the driving force, the speed, and the acceleration using an equation of motion.

16. The deceleration factor estimation apparatus according to claim 15, wherein the deceleration factor estimation unit uses set values for the deceleration factors of the plurality of different deceleration factors other than the particular deceleration factor to be estimated in the equation of motion.

* * * * *